United States Patent
Aigner et al.

(10) Patent No.: US 10,150,431 B2
(45) Date of Patent: Dec. 11, 2018

(54) HOLDING PART AND METHOD FOR FASTENING ELECTRICAL WIRES AND A WIRING ARRANGEMENT IN A VEHICLE

(71) Applicant: Lisa Draexlmaier GmbH, Vilsbiburg (DE)

(72) Inventors: Severin Aigner, Ergolding (DE); Guenther Jakob, Rossbach (DE)

(73) Assignee: Lisa Draextmaier GmbH, Vilsbiburg (DE)

( * ) Notice: Subject to any disclaimer, the term of this patent is extended or adjusted under 35 U.S.C. 154(b) by 0 days.

(21) Appl. No.: 15/646,939

(22) Filed: Jul. 11, 2017

(65) Prior Publication Data
US 2018/0015890 A1    Jan. 18, 2018

(30) Foreign Application Priority Data
Jul. 12, 2016   (DE) .................. 10 2016 112 758

(51) Int. Cl.
*H02G 3/32* (2006.01)
*B60R 16/02* (2006.01)
*H01B 7/00* (2006.01)

(52) U.S. Cl.
CPC .......... *B60R 16/0215* (2013.01); *H02G 3/32* (2013.01); *H01B 7/0045* (2013.01)

(58) Field of Classification Search
USPC ...................................... 174/72 A
See application file for complete search history.

(56) References Cited

U.S. PATENT DOCUMENTS 3,346,688 A * 10/1967 Fields ............ F16L 3/23
                                                174/68.3
5,535,969 A *  7/1996 Duffy, Jr. ........ F16L 3/227
                                                24/487
(Continued)

FOREIGN PATENT DOCUMENTS

DE       198 01 401 A1   7/1999
DE    10 2007 044 508 A1  3/2009
(Continued)

OTHER PUBLICATIONS

German Office Action for German Application No. 10 2016 112 758.2, dated Apr. 26, 2017.

*Primary Examiner* — William H Mayo, III
*Assistant Examiner* — Krystal Robinson
(74) *Attorney, Agent, or Firm* — Finnegan, Henderson, Farabow, Garret & Dunner LLP

(57) ABSTRACT

Embodiments disclose a holding part for fastening electrical wires to a vehicle with at least one first shell element and at least one second shell element, which is formed separately from the first shell element. At least one fastener is attached to or is integral to one of the shell elements and is configured to couple with an opposing element. In addition, there is at least one bridging element connected to one of the shell elements The first shell element and the second shell element form a receiving space between them for the wires when joined together, which is divided by the bridging element that extends through it to form at least two bundles of wires. Additional embodiments disclose a wiring arrangement with such a holding part, and a method for fastening electrical wires to a vehicle.

20 Claims, 3 Drawing Sheets

(56) References Cited

U.S. PATENT DOCUMENTS

| | | | | |
|---|---|---|---|---|
| 5,906,342 A * | 5/1999 | Kraus | ...................... | F16L 3/127 |
| | | | | 24/16 PB |
| 5,942,724 A * | 8/1999 | Russo | .................. | H02G 3/0431 |
| | | | | 174/481 |
| 7,007,900 B2 * | 3/2006 | Goodwin | ............... | H02G 7/053 |
| | | | | 248/68.1 |
| 8,507,794 B2 * | 8/2013 | Wada | ....................... | H02G 3/32 |
| | | | | 174/135 |
| 2012/0267166 A1 | 10/2012 | Wada | | |

FOREIGN PATENT DOCUMENTS

| | | |
|---|---|---|
| EP | 1 258 961 A2 | 11/2002 |
| JP | H07-122135 | 5/1995 |
| JP | H09-46849 A | 2/1997 |
| JP | H09-46851 A | 2/1997 |
| JP | H0946849 A * | 2/1997 |

\* cited by examiner

HOLDING PART AND METHOD FOR FASTENING ELECTRICAL WIRES AND A WIRING ARRANGEMENT IN A VEHICLE

CROSS REFERENCE TO RELATED APPLICATIONS

This application is based upon and claims the benefit of prior German Patent Application No. 10 2016 112 758.2, filed on Jul. 12, 2016, the entire contents of which are incorporated herein by reference.

TECHNICAL FIELD

The present disclosure relates to a holding part for fastening electrical wires, in particular electrical wires to be bundled together, to a vehicle. The vehicle may be a motor, hybrid, or electric vehicle. The present disclosure further relates to an electrical wiring arrangement, for example a wiring harness or cable harness and/or loom of cable, with such a holding part, and a method for fastening electrical wires to a vehicle.

BACKGROUND

Holding parts and processes for fastening electrical wires to a vehicle are known.

For example, German patent application DE 198 01 401 A1 describes a holding part for fastening a loom of cable to a vehicle component. In this holding part, a strip-shaped base element stretches along the electrical wires, which are bundled together into a loom of cable. A plurality of fasteners are arranged on the base element, which are used for fastening to the vehicle. The wires are fixed onto the base element using holders, for example cable ties or wrapping tape. The disadvantage of this is that an individual holding part must be provided for each bundle of wires, which makes the installation complex to assemble.

German patent application DE 10 2007 044 508 A1 describes a further holding part. This holding part has an inset with a plurality of receiving chambers running parallel in a longitudinal direction, which can have cables inserted into them through lateral openings. A flexible strip surrounds the insertion part and at least partly closes the openings. The disadvantage of this is that production of the wiring harness with this holding part is complicated as the wires must be inserted into the holding part from a lateral direction.

SUMMARY

Exemplary embodiments of the present disclosure may use a construction to allow electrical wires to be bundled together with minimal installation complexity. In some embodiments, the wires can be kept physically separate from each other.

Embodiments of the present disclosure provide a holding part configured to fasten electrical wires, which can be a stranded wire, cables, or the like, to a vehicle. The wires can comprise one or a plurality of cables for electrical loads and/or one or a plurality of data lines for data communication in the vehicle. The holding part includes a first shell element and a second shell element. The holding part may be produced from plastic, for example by injection molding. The second shell element may be complementary and separately formed from the first shell element. The shell elements may be substantially sheet-shaped members. The shell elements may have different geometric forms. By way of example, the shell elements can also be curved around each other, and in some embodiments convexly. The shell elements may be formed in such a way that the holding part can be completely enclosed around its circumference by shell elements joined together. At least one of the two shell elements has at least one fastener attached or integral to it. The fastener may be self-adhesive. The fastener may also be formed monolithically in a single piece including the shell element. The fastener is configured so that it may couple by form-fitting or force-fitting to an opposing element, such as a body panel part of the vehicle, or a building board during the production of the wiring harness.

According to embodiments of the present disclosure, at least one attached or integral bridging element extends from at least one of the two shell elements. The bridging element may be a substantially strip-shaped planar member. There may also be two or more bridging elements that may cross over. The bridging element is configured in such a way as to separate individual wires from each other, and to ensure stability. When the first shell element and the second shell element are joined together, they create a receiving space for the wires between them. The receiving space may have various cross-sectional shapes in order to accommodate the bundle of wires formed within. The shape of the cross-section is generally determined by the geometrical design of the shell elements, particularly by their size, curvature, and the like. When the shell elements are joined together, the receiving space is divided into at least two bundles of wires by the bridging element that extends through them. The bridging element may extend between the shell elements. Accordingly, there may be a first bundle of wires on the first side of the bridging element and a second bundle of wires on the second side of the bridging element.

A holding part in accordance with embodiments of the present disclosure may achieve a plurality of exemplary advantageous effects. For example, the shape of the bundle of wires can be predefined by the use of differently shaped shell elements. The bridging element enables a physical separation of, for instance, highly-dynamic consumer wires and disruption-sensitive data wires, so that the EMC (electro-magnetic capacity) is improved. Since the shell element may include the bridging element, the wires can be separated from one another by the bridging element even as they are laid into the shell element, and can therefore be grouped together in sensible bundles. Accordingly, the number of overlaps or branches of wires in the bundle can be reduced, so that a wiring arrangement produced using the holding part is easier to secure in the vehicle. Due to the fact that a fastener may be attached to or made integral to one of the shell elements, the fastener does not slip out of position when the wires are placed into the shell element. In addition, the holding part may fulfill the function of a cable shaft, but has an elegant design and requires less material, and is therefore cost-effective.

According to embodiments of the present disclosure, the first and second shell elements can be joined and held together using the bridging element. The bridging element therefore may fulfill a double function, namely as a separation element for the receiving space, i.e., to split the wires into bundles, and as a fastening element for fastening the two shell elements to each other. As such, further fastening elements may be omitted for the shell elements. However, it is not necessary that other fastening elements be omitted, and additional fastening elements may also be provided, for example on the edge of the shell elements.

According to embodiments of the present disclosure, the shell elements may be fastened to each other without tools.

The bridging element may be inserted into the other shell element and locked there. For example, one of the shell elements may include the bridging element, and the other shell element may include a complementary opening for the bridging element so that the bridging element can be inserted into it. Once the bridging element has been inserted it can be locked into place.

According to embodiments of the present disclosure, the two shell elements may be locked together. The bridging element may include a locking element to attach it to the other shell element.

According to embodiments of the present disclosure, the locking element may comprise a toothed section. The toothed section may include a plurality of locking teeth such that the other shell element can be pushed onto the bridging element as far as is needed to achieve a desired bundle thickness, and so that there is still a locking tooth available for locking onto the other shell element. Where there is a narrow wire bundle, for example, if part of the bridging element protrudes beyond the other shell element, the bridging element can be cut off using pliers, etc. This enables a high degree of flexibility for accommodating different bundle diameters.

According to embodiments of the present disclosure, the other shell element may have an opening, for example a recess or through-hole, with opposing locking elements to connect with locking elements on the bridging element. The opposing locking elements can be, for example, a catch or latch that can be connected to the locking element on the bridging element.

According to embodiments of the present disclosure, the EMC can be further improved if the bridging element is formed as a shield. For example, a coating of metal, metal particles, or a strip-shaped shield may be applied to the plastic material of the bridging element.

According to embodiments of the present disclosure, two bridging elements may be arranged at right angles to each other running through the receiving space. In this way, the receiving space can be sub-divided into four receiving chambers such that a plurality of individual bundles of wires can be formed. Accordingly, branches from the wiring harness may be formed easily. The number of bridging elements is not limited to one or two. For example, a star-shaped arrangement of receiving spaces may be provided using a plurality of bridging elements.

According to embodiments of the present disclosure, the bridging element may extend generally through the middle of the receiving space. For example, the holding part may be configured to be symmetric with respect to the extending direction of the bridging element. As such, a good distribution of mechanical forces within the holding part can be achieved. Furthermore, the holding part is simple to produce using injection molding.

According to embodiments of the present disclosure, the fastener and the bridging element can be attached or be integral to the same shell element. Accordingly, one of the shell elements may include both the fastener and the bridging element. The shell element may be formed monolithically with the fastener and the bridging element. The fastener may extend in one direction and the bridging element in the opposite direction, away from the shell element. The one direction and the opposite direction may be aligned. In exemplary embodiments, assembly of the holding part is thus made simple.

According to embodiments of the present disclosure, the holding element may be a self-securing clip. Accordingly, ease of assembly of the holding part can be further improved. The holding element may be a push fastener, a bolt clip, or the like. These can be simply fixed to the opposing element, for example to a body panel part of the vehicle, or a building board during the production of the wiring harness.

According to embodiments of the present disclosure, the holding part can also be used to attach wires or bundles of wires in areas that require a high level of mechanical stability and/or require the bundle of wire to be very long, without needing to install high-cost boxes or cable shafts. A plurality of shell elements, i.e. at least two, may be joined together to form a wiring channel along a connecting section that extends perpendicularly to the bridging element. The connecting section may extend in the longitudinal direction of the wires. Furthermore, more than two shell elements may be combined. In addition, the first shell elements may be joined to each other using a first connecting section, and the second shell elements may be joined to each other using a second connecting section. The connecting section(s) may be formed as a single piece with the shell elements. The bridging element may also extend from one shell element across the whole length of the connecting section to the next shell element.

Embodiments of the present disclosure also relate to an electrical wiring arrangement in a vehicle. According to embodiments of the present disclosure, the wiring arrangement has a plurality of electrical wires which are fastened to the vehicle using a holding part in one or more of the types of embodiments described above. For example, at least one electrical wire is attached to a first side of the holding part's bridging element, and at least one further electrical wire is arranged on a second side of the bridging element. In some embodiments, physical separation of the wires enables an improvement to the EMC, as disturbance-sensitive data wires and consumer wires can be separated from each other by the bridging element. In addition, the overlapping and crossing of wires are effectively avoided.

Embodiments of the present disclosure also relate to a method of fastening electrical wires to a vehicle. In particular, the method may be carried out using the holding part described above. The method has the following steps:

Firstly, a first shell element of a holding part is fastened to an opposing element, such as a part of the vehicle or a building board used during the production of the wiring harness, using the holding part's fastener, such as a clip or the like. An advantage of this is that the shell element is already fastened to the opposing element prior to the fixing of wires, rather than after the placing and processing of the wires.

Next, at least one electrical wire is attached to a first side of a bridging element that extends away from the first shell element, and at least one further electrical wire is attached to a second side of the bridging element. The extending direction of the bridging element may be a normal direction relative to the first shell element. The wires are therefore separated by the bridging element. The separation may have an advantageous effect on the EMC and make it simpler to tap or branch the bundle of wires, since wires that need to be tapped or branched are arranged on the same side of the bridging element.

Subsequently, a second shell element is placed onto the bridging element. In this way the wires lying on the first shell element are grouped into a bundle. In some embodiments, despite being bundled together, wires that were laid separately on either side of the bridging element remain separate.

The second shell element is locked to the bridging element. This attaches the second shell element to the first shell element via the bridging element.

To achieve greater mechanical stability, the holding part can be wrapped following locking. For example, the holding part can be wrapped in sections. In particular, the shell elements can be wrapped using wrapping tape, sticky tape, a cable tie, or the like.

The described properties of the present disclosure and the manner in which these are achieved will be described in more detail based on the following detailed description. The foregoing general description and the following detailed description are exemplary and explanatory only, and are not restrictive of embodiments consistent with the present disclosure. Further, the accompanying drawings illustrate embodiments of the present disclosure, and together with the description, serve to explain principles of the present disclosure.

BRIEF DESCRIPTION OF THE DRAWINGS

The above and other aspects of the present disclosure will become more apparent by describing exemplary embodiments in detail below with reference to the accompanying drawings, in which.

The figures are only schematic representations and are used purely to explain certain exemplary embodiments. Similar elements, or those that work in a similar way, are provided with the same reference signs throughout.

DETAILED DESCRIPTION

As used throughout the present disclosure, the expression "A and/or B" shall mean A alone, B alone, or A and B together. Expressions such as "at least one of" do not necessarily modify an entirety of a following list and do not necessarily modify each member of the list, such that "at least one of A, B, and C" should be understood as including only one of A, only one of B, only one of C, or any combination of A, B, and C.

Figure 1:
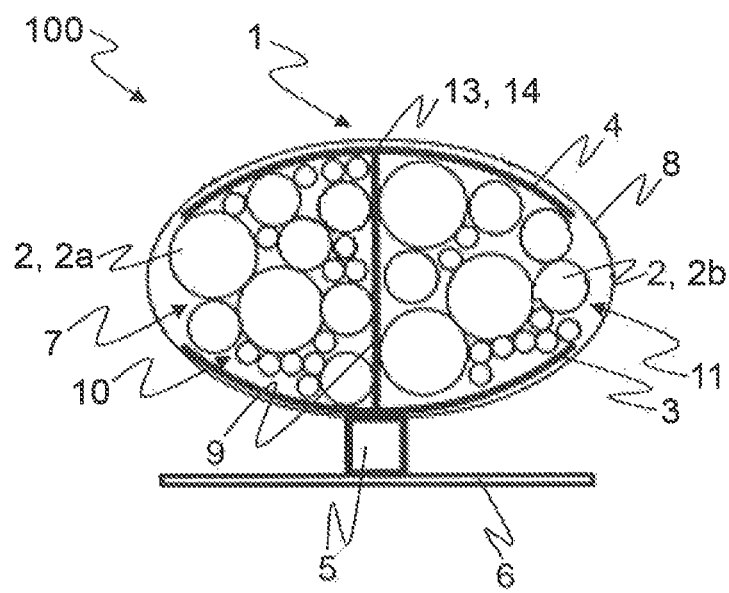
FIG. 1 shows a cross-section of a holding part with a first and a second shell element, with wires arranged between, in accordance with a first exemplary embodiment.

FIG. 1 shows a wiring arrangement 100 in cross section, in particular in the shape of a wiring harness or cable harness. The wiring arrangement 100 may be applied for installation into a vehicle in which it will be fastened at a plurality of points along its length.

The wiring arrangement 100 comprises one holding part 1, made from plastic, that is set up to bundle together and hold a plurality of individual wires 2. The holding part 1 has a first shell element 3, shown as the lower element in FIG. 1, and a complementary second shell element 4, shown as the upper element in FIG. 1. In this exemplary embodiment, both shell elements 3, 4 have a curved cross-sectional shape. The shell elements 3, 4 curve toward one another. A fastener 5 is attached to the first shell element 3 by being formed monolithically in a single piece with the first shell element 3. The fastener 5 is a fastening clip, such as a push fastener (hole clip) for fastening into a complementary opening or a bolt clip for fastening to a corresponding bolt. The fastener 5 is used to fasten the first shell element 3 to an opposing element 6, which could be a building board (e.g. mounting aid, or wiring jig) from the wiring harness production during the pre-assembly of the wiring arrangement 100, or a body panel part or similar on the vehicle.

In the joined condition depicted, the first shell element 3 and the second shell element 4 form a receiving space 7 between them, in which the wires 2 are inserted. The receiving space 7 is substantially enclosed by the shell elements 3, 4 being placed so close to each other that their edges are almost touching. The shell elements 3, 4 may also be joined so that their edges are touching. As shown in FIG. 1, the joined shell elements 3, 4 are wrapped with a wrapping tape 8. The wrapping tape 8 can be saved on shell elements 3, 4 when they are joined to each other at the edges, as the wires 2 are just held together by the shell elements 3, 4.

A bridging element 9 extends through the receiving area 7 within both the shell elements 3, 4. The bridging element 9 is depicted here, by way of example, as being of a single piece with the first shell element 3, and running across to the second shell element 4. The receiving area 7 is here divided, by way of example, into a first receiving chamber 10 and a second receiving chamber 11. One part 2a of the wires 2 is housed in the first receiving chamber 10, and a further part 2b of the wires 2 is housed in the second receiving chamber 11. The parts 2a and 2b of the wires 2 are divided in such a way depending on their type, that the first receiving chamber 10, for example, predominantly houses signal wires for data communication, and the second receiving chamber 11 houses predominantly consumer wires for electricity supply. In this way the EMC of the wires 2 can be improved.

Figure 2:
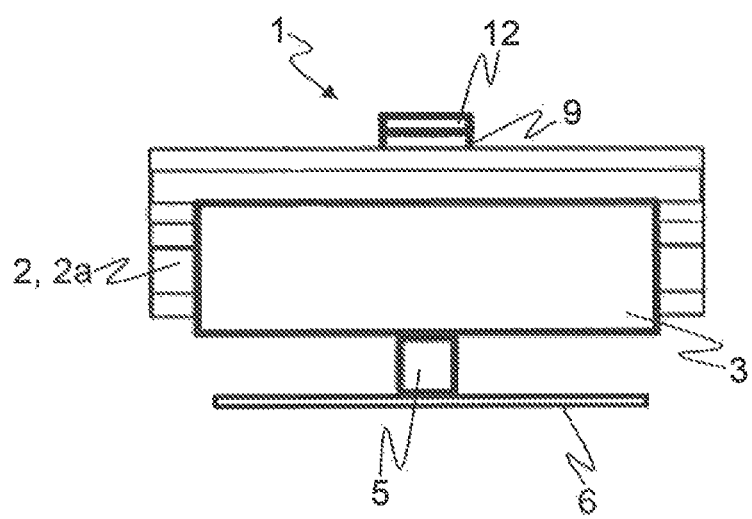
FIG. 2 shows a side view of a holding part, with a first shell element, wires placed in, but no second shell element.

FIG. 2 depicts a holding part 1 in a side view without showing the second shell element 4. It can be seen that the bridging 9 has a locking element 12 on an end extending away from the fastener 5, i.e. on an end extending towards the second shell element 4 when assembled. The locking element 12 here is a toothed section with a plurality of locking teeth, similar to the male part of a cable tie. The plurality of locking teeth may be aligned in an extending direction of the bridging element 9. The bridging element 9 is routed with the locking element 12 sufficiently so that it protrudes beyond the inserted wires 2. The locking element 12 is configured so that the second shell element 4 can be attached using an opening 13 (see FIG. 1), to which end an opposing locking element 14 is attached. The opposing locking element 14 may form part of the opening 13. The opposing locking element 14 may comprise a catch or latch that can be connected to the locking element 12 on the bridging element 9, The opposing locking element 14 may comprise a resilient element configured to engage the plurality of locking teeth such that the attachment of the second shell element 4 can be adjusted as the opposing locking element advances along the plurality of locking teeth. In order to join together the first and second shell elements 3, 4, the second shell element 4 can be stacked on top of the bridging element 9, and the opposing locking element 14 can be locked to the locking element 12. In this way, the second shell element 4 is fastened to the first shell element 3 using the bridging element 9. By stacking the second shell element 4 on top of the bridging element 9, the second element 4 is pushed in the direction of the first shell element 3 sufficiently to obtain the desired bundle thickness of the wires 2. Any part of the bridging element 9 that may protrude beyond the second shell element 4 may be cut off with pliers, for example, similar to a cable tie.

Figure 3:
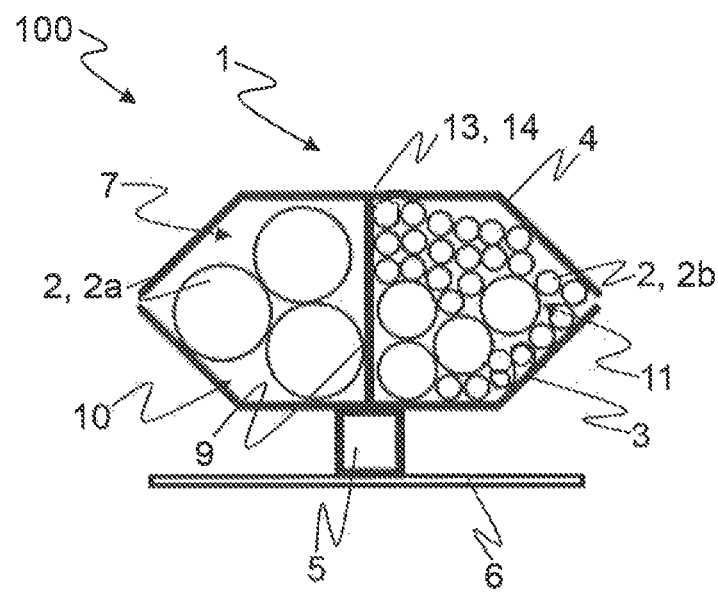
FIG. 3 shows a holding part in accordance with a second exemplary embodiment.

FIG. 3 shows a further exemplary embodiment of the holding part 1 in cross-section. Notwithstanding the above descriptions, the shell elements 3, 4 here have a cross section that approaches a trapezoid in shape. It can be seen that the shell elements 3, 4 are generally arranged to be touching each other, so that the wires 2 are held in the receiving area 7 only by the shell elements 3, 4 themselves. It can also be seen that in the first receiving chamber 10 the wires 2a have larger cross sections, and in the second receiving chamber 11 the wires 2b have smaller cross sections.

Figure 4:
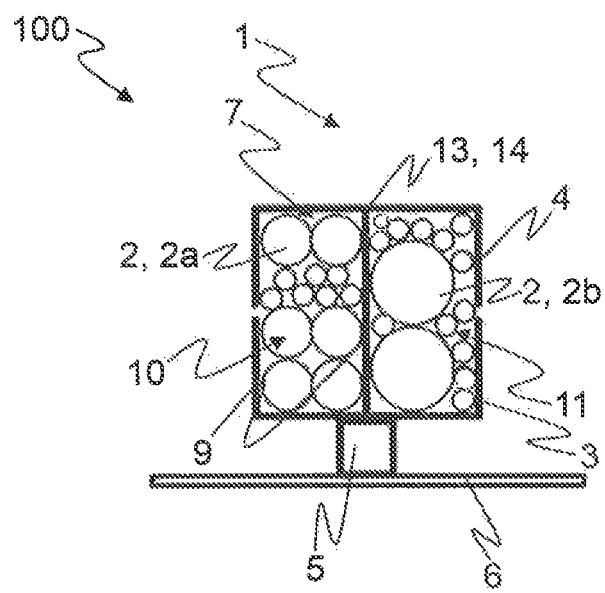
FIG. 4 shows a holding part in accordance with a third exemplary embodiment.

FIG. 4 shows a further exemplary embodiment of the holding part 1 in cross-section. In contrast to the above description, the shell elements 3, 4 here have a generally rectangular cross section.

Figure 5:
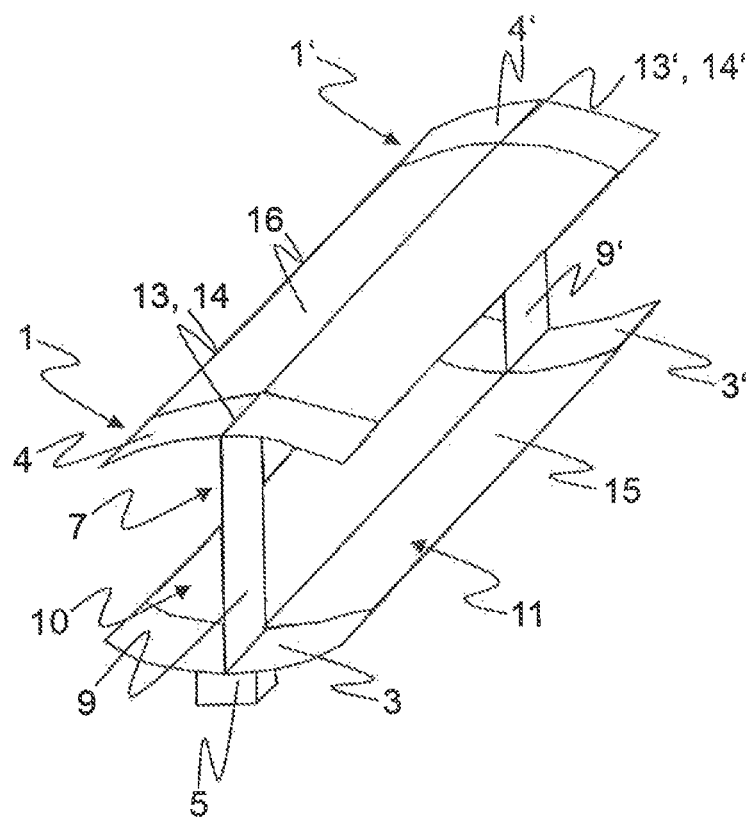
FIG. 5 shows a holding part in which a plurality of shell elements are joined together with connecting sections.

FIG. 5 shows, in a perspective front elevation view, an arrangement with two exemplary identical holding parts 1 and 1' attached to each other. The first shell elements 3, 3' of the holding parts 1, 1' are connected to each other by a first connecting section 15 and the second shell elements 4, 4' are connected by a second connecting section 16 to form a wire channel. The connecting sections 15, 16 are generally arranged at right angles to the bridging elements 9, 9' and in this exemplary embodiment are formed monolithically as a single piece with the respective shell elements 3, 3' or 4, 4'. It also follows from FIG. 5 that the bridging elements 9, 9' run along the whole length of the shell elements 3, 3', 4, 4'. It is also possible that the bridging elements 9, 9' likewise extend through between the shell elements 3, 3', 4, 4'. Fasteners 5, 5' are again provided to fasten the holding parts 1, 1'.

A method to fasten the electrical wires 2 to the opposing element 6, for example to a building board or a vehicle, with the aid of one or more holding parts 1, can proceed as described below.

Firstly, the first shell element 3 of the holding part 1 is fastened to the opposing element 6, e.g. a building board or a body panel part, using the fastener 5 of the holding part 1, for example by inserting the fastener into an opening (not shown) on the opposing element 6. Then the wires 2a are placed onto a first side of the bridging element 9, e.g. into the first receiving chamber 10, and at least one further wire 2b is placed onto a second side of the bridging element 9, e.g. into the second receiving chamber 11. Then the second shell element 4 is stacked onto the bridging element 9 by inserting the end of the bridging element 9 that has the locking element 12 into the opening 13 of the second shell element 4. At the same time, the shell element 4 is pushed along the bridging element 9 in the direction of the first shell element 3 until the desired bundle shape or thickness is achieved. The second shell element 4 is locked to the bridging element 9 to fasten the two shell elements 3, 4 to each other. The locking mechanism of the locking element 12 and the opening 13 may be self-locking, similar to a cable tie, for example. Depending on the bundle thickness or amount of protruding of the bridging element 9 beyond the second shell element 4, the protruding end of the bridging element 9 may be cut off. A wrapping tape may be wound around the shell elements 3, 4 to give the wiring arrangement 100 greater mechanical stability.

The holding part 1 according to the present disclosure, the wiring arrangement 100, and the method described above can be varied in a plurality of ways, starting from the exemplary embodiments presented. It is also contemplated that the bridging element 9 can act as a shield to improve the EMC, for example by the application of a coating or a sticky tape with a metallic substance suitable for shielding. It is also possible that the bridging element 9 is produced as a 2-component piece through spray injection, whereby a metal plate or similar is inserted for shielding. The parts 2a and 2b of the wires 2 can also be separated without considering the EMC, depending on whether or not the wires 2 branch off from a main loom of wire. The receiving area 7 can also be divided by a plurality of bridging elements 9, for example by two crossing bridging elements 9 arranged at right angles to each other. This means the receiving area 7 can be divided into four or more receiving chambers.

Having described aspects of the present disclosure in detail, it will be apparent that further modifications and variations are possible without departing from the scope of aspects of the present disclosure as defined in the appended claims. As various changes could be made in the above constructions, products, and methods without departing from the scope of aspects of the present disclosure, it is intended that all matter contained in the above description and shown in the accompanying drawings shall be interpreted as illustrative and not in a limiting sense.

LIST OF REFERENCE NUMBERS

100 Wiring arrangement (e.g. wiring harness, cable harness)
1, 1' Holding part(s)
2, 2a, 2b Wire(s)
3, 3' First shell element
4, 4' Second shell element
5, 5' Fastener (e.g. fastening clip)
6 Opposing element (e.g. building board, body panel part)
7 Receiving space
8 Wrapping tape (e.g. fabric tape, sticky tape)
9, 9' Bridging element
10 First receiving chamber
11 Second receiving chamber
12 Locking element (e.g. interlock, locking teeth)
13 Opening
14 Opposing locking element (e.g. catch, latch)
15 First connecting section
16 Second connecting section

What is claimed is:
1. A holding part for fastening cables to a vehicle, comprising:
   at least one first shell element;
   at least one second shell element, which is formed separately from the first shell element;
   at least one fastener configured to couple with an opposing element, the fastener being attached to or part of one of the first shell element and the second shell element; and
   at least one bridging element attached to or part of one of the first shell element and the second shell element,
   wherein the bridging element comprises a locking element having a plurality of locking teeth configured to engage with at least one of the first shell element and the second shell element,
   wherein the first shell element and the second shell element form a receiving space therebetween that is determined in part by which of the locking teeth is engaged with the at least one of the first shell element and the second shell element and that is configured to accommodate the cables when the first shell element and the second shell element are joined together, the receiving space being divided by the bridging element that extends therethrough to thereby form at least two chambers in the receiving space for accommodating the cables.

2. A holding part according to claim 1, wherein the first shell element and the second shell element are configured to be joined together by the bridging element.

3. A holding part according to claim 1, wherein the bridging element, which is attached to or part of the one of the first shell element and the second shell element, is configured to be inserted into the other of the first shell element and the second shell element and locked in place.

4. A holding part according to claim 3, wherein the other of the first shell element and the second shell element comprises an opening with an opposing locking element configured to bring the other of the first shell element and the second shell element into contact with the bridging element.

5. A holding part according to claim 1, wherein the bridging element comprises a shield.

6. A holding part according to claim 5, wherein the shield is an electromagnetic shielding layer coated on the bridging element.

7. A holding part according to claim 1, wherein two bridging elements are arranged at right angles to each other and extend through the receiving space.

8. A holding part according to claim 1, wherein the fastener and the bridging element are arranged on or are integral to the one of the first shell element and the second shell element.

9. A holding part according to claim 1, wherein the holding element is a self-locking clip.

10. A holding part according to claim 1, wherein a plurality of shell elements are joined together substantially at right angles to the bridging element, in an extending connecting section so as to form a wiring channel.

11. A holding part according to claim 1, wherein the bridging element is monolithically formed with the one of the first shell element and the second shell element.

12. A holding part according to claim 1, wherein the plurality of locking teeth are aligned in an extending direction of the bridging element, the extending direction being a direction in which the bridging element is brought into contact with the other of the first shell element and the second shell element.

13. A holding part according to claim 12, wherein
the first shell element and the second shell element are joined together substantially at right angles to the bridging element, in an extending connecting section so as to form a channel extending in a longitudinal direction of the cables, and
the extending direction of the bridging element is perpendicular to the longitudinal direction of the cables.

14. A holding part according to claim 1, wherein
the bridging element which is attached to or part of one of the first shell element and the second shell element extends away from the one of the first shell element and the second shell element in a normal direction.

15. A holding part according to claim 14, wherein
the bridging element is a substantially planar member, and the plurality of locking teeth protrude from a surface of the bridging element.

16. A holding part according to claim 1, wherein the cables are wires.

17. A holding part according to claim 16, wherein the wires are electrical wires.

18. An electrical wiring arrangement for a vehicle, comprising:
a holding part comprising:
at least one first shell element;
at least one second shell element, which is formed separately from the first shell element;
at least one fastener configured to couple with an opposing element, the fastener being attached to or part of one of the first shell element and the second shell element; and
at least one bridging element attached to or part of one of the first shell element and the second shell element,
wherein the bridging element comprises a locking element having a plurality of locking teeth configured to engage with at least one of the first shell element and the second shell element,
wherein the first shell element and the second shell element form a receiving space therebetween that is determined in part by which of the locking teeth is engaged with the at least one of the first shell element and the second shell element and that is configured to accommodate a plurality of electrical wires when the first shell element and the second shell element is joined together, the receiving space being divided by the bridging element that extends therethrough to thereby form at least two chambers in the receiving space for accommodating the electrical wires,
wherein the plurality of electrical wires are fastened to the vehicle using the holding part, and
at least one first electrical wire of the electrical wires is arranged on a first side of the bridging element of the holding part, and at least one second electrical wire of the electrical wires is arranged on a second side of the bridging element.

19. A method of fastening electrical wires to a vehicle, the method comprising:
fastening a first shell element of a holding part to an opposing element using a fastener of the holding part;
arranging at least one first electrical wire of the electrical wires to a first side of a bridging element that extends away from the first shell element and at least one second electrical wire of the electrical wires onto a second side of the bridging element,
stacking a second shell element onto the bridging element so that a receiving space between the first shell element and the second shell element corresponds to a desired bundle thickness of the electrical wires, and
locking the second shell element onto the bridging element.

20. A method according to claim 19, wherein the first shell element and the second shell element are wrapped at least in sections after locking.

* * * * *